United States Patent
Lee (10) Patent No.: US 7,049,534 B1
(45) Date of Patent: May 23, 2006

(54) FLOAT SWITCH

(76) Inventor: Paulson Lee, 10700 Johnson Ave., Cupertino, CA (US) 95014

( * ) Notice: Subject to any disclaimer, the term of this patent is extended or adjusted under 35 U.S.C. 154(b) by 0 days.

(21) Appl. No.: 11/052,870

(22) Filed: Feb. 9, 2005

(51) Int. Cl.
*H01H 35/18* (2006.01)

(52) U.S. Cl. .................................. 200/84 R; 200/84 B (58) Field of Classification Search ............. 200/84 R, 200/84 B; 417/40, 54, 33, 36, 329; 137/41, 137/44, 557, 558; 340/616, 623, 624; 73/305–322.5
See application file for complete search history.

(56) References Cited

U.S. PATENT DOCUMENTS

| | | | | |
|---|---|---|---|---|
| 4,084,073 A * | 4/1978 | Keener | ...................... | 200/84 R |
| 4,629,841 A * | 12/1986 | Riback et al. | ............... | 200/553 |
| 4,644,117 A * | 2/1987 | Grimes et al. | ............ | 200/84 R |
| 4,692,576 A * | 9/1987 | Frede | ........................ | 200/84 R |
| 5,089,676 A * | 2/1992 | Duncan | ..................... | 200/84 R |
| 5,142,108 A * | 8/1992 | Johnston et al. | .......... | 200/84 R |
| RE34,175 E * | 2/1993 | Grimes et al. | ............ | 200/84 R |
| 5,728,987 A * | 3/1998 | Utke | ......................... | 200/84 R |
| 6,559,397 B1 * | 5/2003 | Beaston | ..................... | 200/84 R |
| 6,864,445 B1 * | 3/2005 | Daly | ........................ | 200/84 R |

* cited by examiner

*Primary Examiner*—Michael Friedhofer
*Assistant Examiner*—Lisa Klaus
(74) *Attorney, Agent, or Firm*—Rosenberg, Klein & Lee (57) ABSTRACT

A float switch comprises a hollow main member in which a bob and a switch are provided. The switch has a bar to control a circuit therein and is connected with a wire, and the bob is connected to the bar of the switch via a L-shaped activating plate whereby the switch is controlled by a movement of the bob. The main member has an apartment therein to receive the bob therein, and the activating plate being pivoted on the main member between the switch and the bob. The activating plate has a first end associated with the bar of the switch and a second end associated with the bob, wherein the second end is fixed to an end of a connecting device, and an opposite end of the connecting device is fixed to the bob.

12 Claims, 8 Drawing Sheets

FLOAT SWITCH

BACKGROUND OF THE INVENTION

1. Field of the Invention

The present invention relates generally to a float switch, and more particularly to a float switch, which turned on or off the power according to the height of water level.

2. Description of the Related Art

Figure 8:
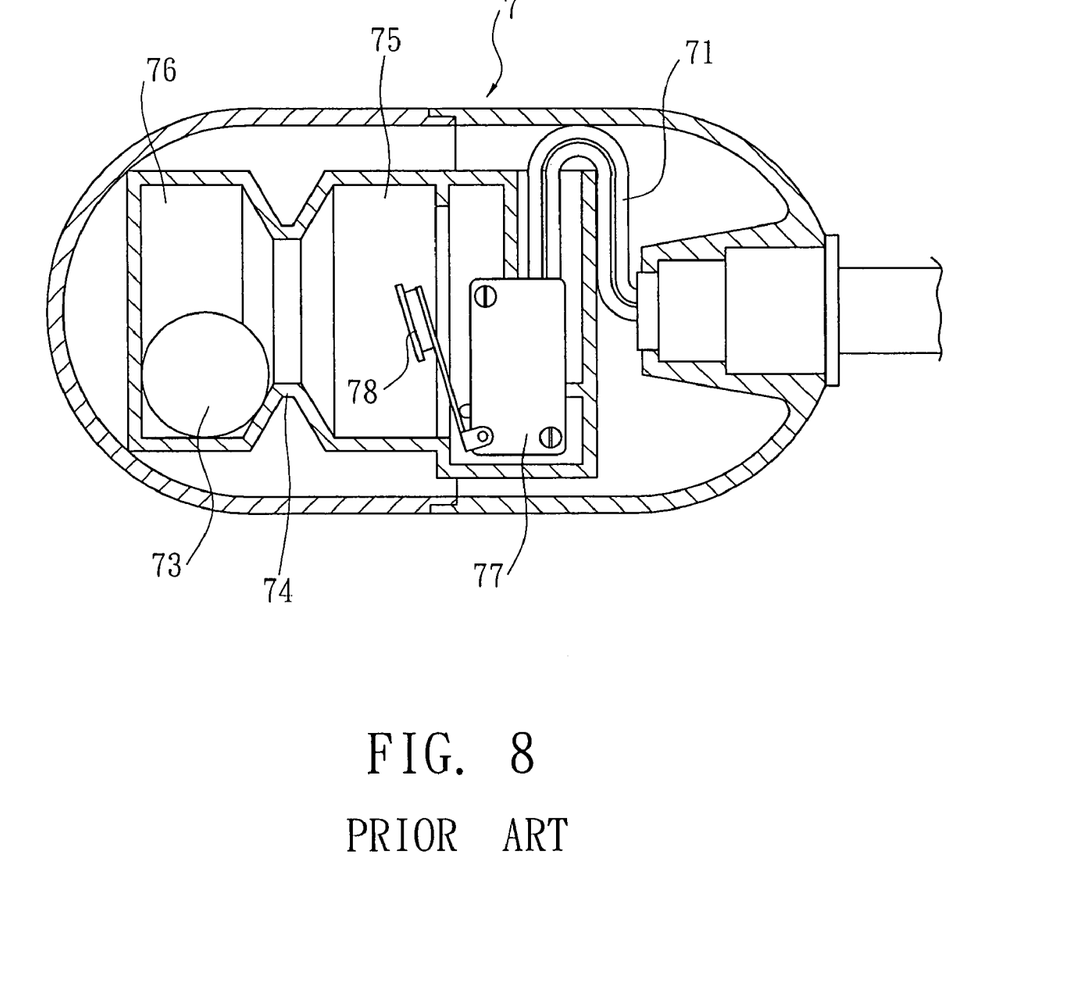
FIG. 8 is a sectional view of the conventional float switch.

As shown in FIG. 8, a conventional float switch, which floats on water of a tank, has a hollow main member 7, in which a chamber 74 is provided, and a wire 71 connected to a pump (not shown). The chamber 74 is divided into a first space 75 and a second space 76. A bob 73 is received in the chamber 74 to move between the first space 75 and the second space 76. A microswitch 77 is mounted in the first space 75 and is connected to the wire 71. The microswitch 77 has a spring (not shown) connected with a pushing device 78, whereby the bob 73 runs to the first space 75 and presses the pushing device 78 to activate the microswitch 77.

While the tank is filled with water, the main member 7 is upright to have the bob 73 running to the first space 75 and pressing the pushing device 78 to turn on the microswitch 77, as a result, the pump stops working. While the liquid level of water is lower, the main member 7 is up side down to have the bob 73 leaving the pushing device 78 and running to the second space 76 to turn on the microswitch 77 and to start the pump.

The power of the conventional float switch is the gravity, which drive the bob 73 running between the first space 75 and the second space 76, and the weight of the bob 73 presses the pushing device 78 to activate the microswitch 77. But, somehow, the bob 73 might not press the pushing device 78 stably because of the water level raising too fast or the waves on water that the microswitch 77 will dump between turn-on and turn-off repeatedly. It makes the power waste as well as damages the microswitch 77 and the pump.

In addition, the pushing device 78 has to be arranged beside the microswitch 77 because of the limitation of the microswitch 77 and a path of the bob 73. As a result, the main member 7 must has an efficient width that the size of the main member 7 is too greater for a narrow space.

SUMMARY OF THE INVENTION

The primary objective of the present invention is to provide a float switch, which the L-shaped activating plate is connected to the switch and the bob respectively. The bob moves the second end of the activating plate because of gravity to move the bar of the switch by the first end of the activating and to turn on the switch while the water level is lower. Because the activating plate is in well connecting with the bob and the activating plate, such that the bob is less affected by the wave on water. As s result, the pump is not turned on and turned off repeatedly. The present invention has an efficient control of elasticity to save power and prevent damage.

A secondary object of the present invention is that the L-shaped activating plate connects the switch and the bob to line the switch and the bob in the main member that reduce the size of the main member to install the float switch of the present invention in a narrow space.

According to the objectives of the present invention, a float switch comprises a hollow main member in which a bob and a switch are provided. The switch has a bar to control a circuit therein and is connected with a wire, and the bob is connected to the bar of the switch via a L-shaped activating plate whereby the switch is controlled by a movement of the bob. The main member has an apartment therein to receive the bob therein, and the activating plate being pivoted on the main member between the switch and the bob. The activating plate has a first end associated with the bar of the switch and a second end associated with the bob, wherein the second end is fixed to an end of a connecting device, and an opposite end of the connecting device is fixed to the bob.

DETAILED DESCRIPTION OF THE INVENTION

FIG. 1 to FIG. 7 show four preferred embodiments of the present invention and the scope of the present invention is not restricted therein.

Figure 1:
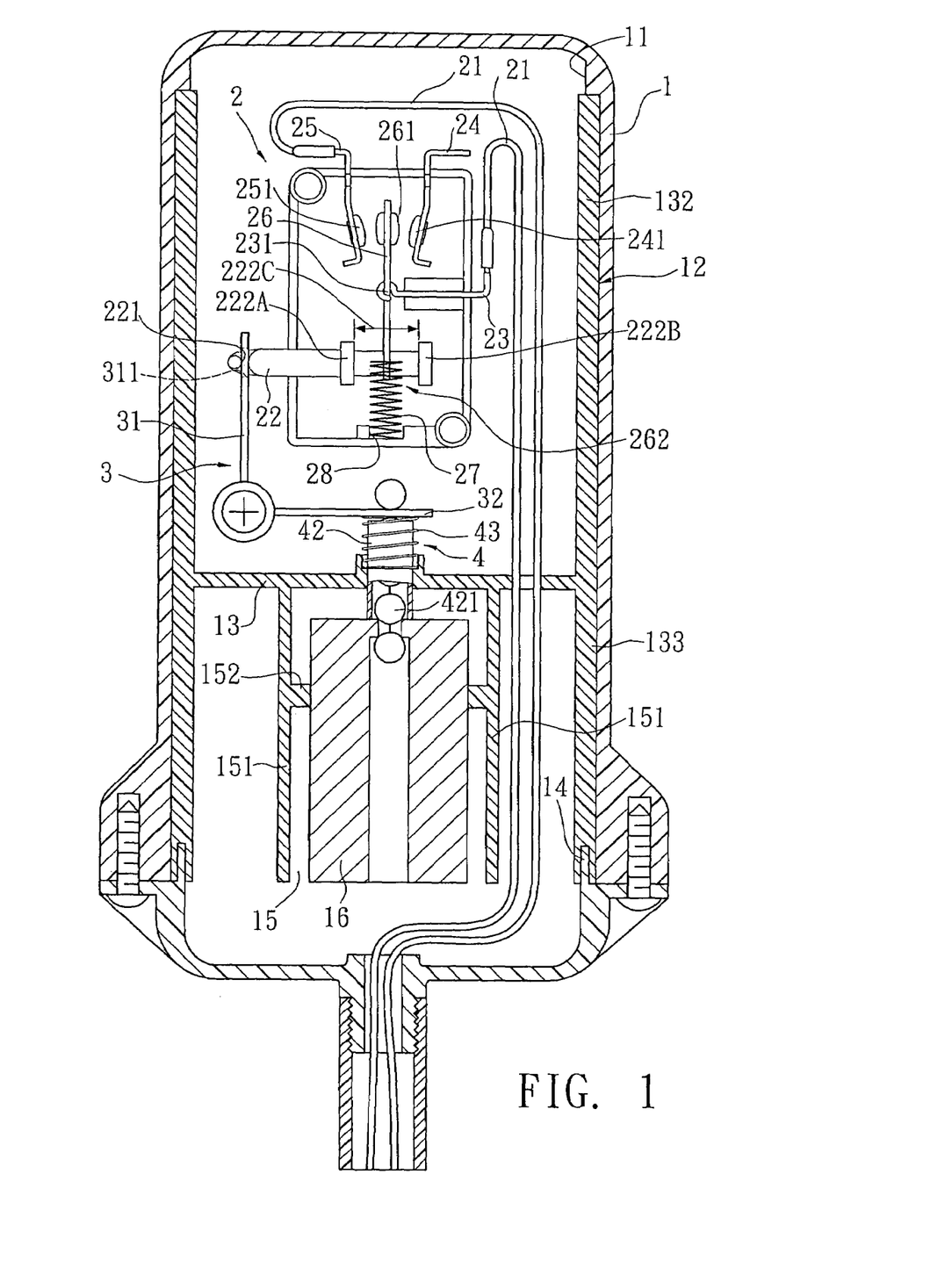
FIG. 1 is a sectional view of a first preferred embodiment of the present invention.

As shown in FIG. 1, a float switch of the first preferred embodiment of the present invention has a hollow main member 1, in which a switch 2, a bob 16 and a L-shaped activating plate 3 are provided. The activating plate 3 has a first end 31 connected to the switch 2 and a second end 32 connected to the bob 16, such that a movement of the bob 16 activates the switch 2 via the activating plate 3. in the present invention, the main member 1 has a stop portion 11 projected from a interior top wall thereof and a frame member 12 associated with the stop portion 11. The frame member 12 has an upper member 132, a lower member 133 and a separating section 13, which has a passageway, between the upper member 132 and the lower member 133. A top of the upper member 132 is rested on the stop portion 11, and the lower frame 133 is fitted to a supporting portion 14 adjacent to a bottom of the main member 1. The frame member 12 has an annular plate 151 projected downwardly from the separating section 13 to have an apartment 15 therein, the apartment 15 have a annular rib 152, in which the bob 16 is received. The switch 2 is fixed to the upper member 132 and connected to a wire 21. The wire 21 has an end extruded out of the main member 1 and connected to a pump (not shown). The switch 2 has a bar 22 with a slot 221 at a distal end thereof. A elliptic hole 311 of the first end 31 of the activating plate 3 is received in the slot 221 of the bar 22. A proximal end of the bar 22 is inserted into the switch 2, which has a first block 222A, a second block 222B and a space 222C between the blocks 222A and 222B. The second block 222B stops the bar 22 from escaping out of the switch 2. The second end 32 of the activating plate 3 is fixed to an end of a connecting device 4, and an opposite end the connecting device 4 is extended to the apartment 15 via the passageway of the separating section 13 to be connected to the bob 16. An expansion spring 43 is fitted to the connecting device 4 between the separating section 13 and the second end 32 of the activating plate 3. In the present preferred embodiment, the connecting device 4 is a tube 42 with a ball chain 421 therein. The ball chain 421 has opposite ends thereof fixed to the second end 32 of the activating plate 3 and the bob 16 respectively, and the tube 42 has opposite ends thereof rested on the second end 32 of the activating plate 3 and the bob 16 respectively to connect the activating plate 3 and the bob 16.

In the present preferred embodiment, the switch 2 has a first terminal 23, a second terminal 24 and a third terminal 25 to be electrically connected to the wire 21. The first terminal 23 has a pivot portion 231 at an end thereof opposite to the wire 21 to pivot a middle section of a lever 26 thereon. The lever 26 has a first electrical contact portion 261 at an end thereof, and an opposite end of the lever 26 is located in the space 22C between the first block 222A and the second block 222B of the bar 22. An elastic member 27 has opposite ends fitted to the end of the level 26 in the space 222C and rested in a recess 28 on the interior wall of the main member 2 to form a joint 262. A width of the space 222C is greater than that of the joint 262. The second terminal 24 has a second electrical contact portion 241 at an end thereof opposite to the wire 21. The second electrical contact portion 241 is associated with the first electrical contact portion 261 of the lever 26 to be connected thereto for a circuit. The third terminal 25 has a third electrical contact portion 251 at an end thereof opposite to the wire 21. The second electrical contact portion 241 is associated with the first electrical contact portion 261 of the lever 26 but opposite to the second electrical contact portion 241 to be connected thereto for another circuit.

Figure 2:
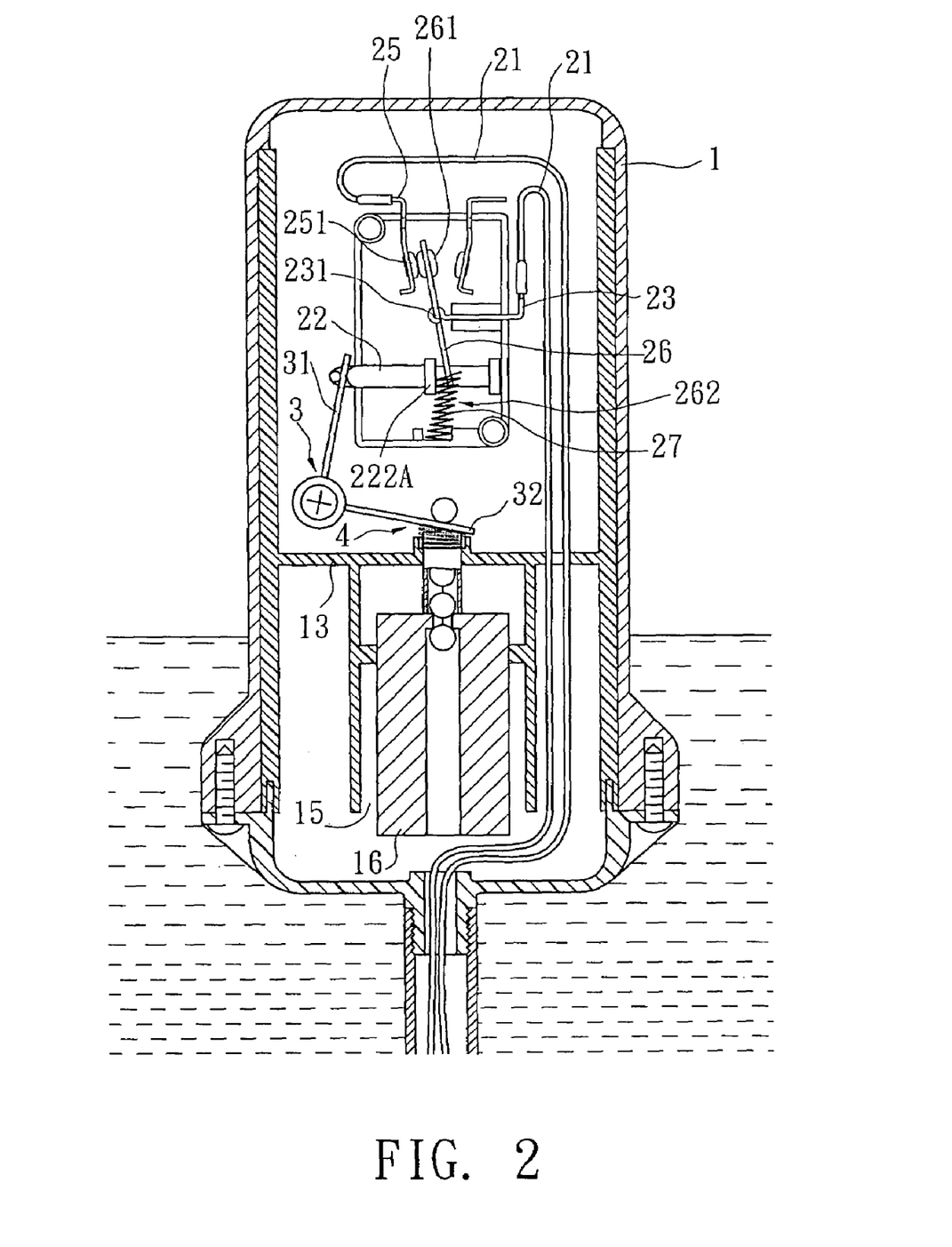
FIG. 2 is a sectional view of the first preferred embodiment of the present invention, showing water being pumped out.

While float switch of the present invention is provided to control the pump pumping water out of a tank, the wire 21 is connected to the first terminal 23 and the third terminal 25 of the switch 2. As shown in FIG. 2, because the end of the wire 21 connected to the main member 1 is fixed, the main member 1 is upright when the water level reaches a predetermined height. In the meantime, the bob 16 moves distal to the separating section 13 because of gravity. By the connecting device 4 that connects the bob 16 and the second end 32 of the activating plate 3, the first end 31 of the activating plate 3 moves the bar 22 of the switch 2 inward because the second end 32 of the activating plate 3 is moved downwardly by the connecting device 4 when the bob 16 moves distal to the separating section 13. Therefore, the first block 222A of the bar 22 moves the joint 262 of the lever 26 fitted to the elastic member 27 to move the first electrical contact portion 261 of the level 26 to the third electrical contact portion 251 of the third terminal 25 for the circuit because the lever 26 has the middle section thereof pivoted on the pivot portion 231 of the first terminal 23. As a result, the pump is turned on.

Figure 3:
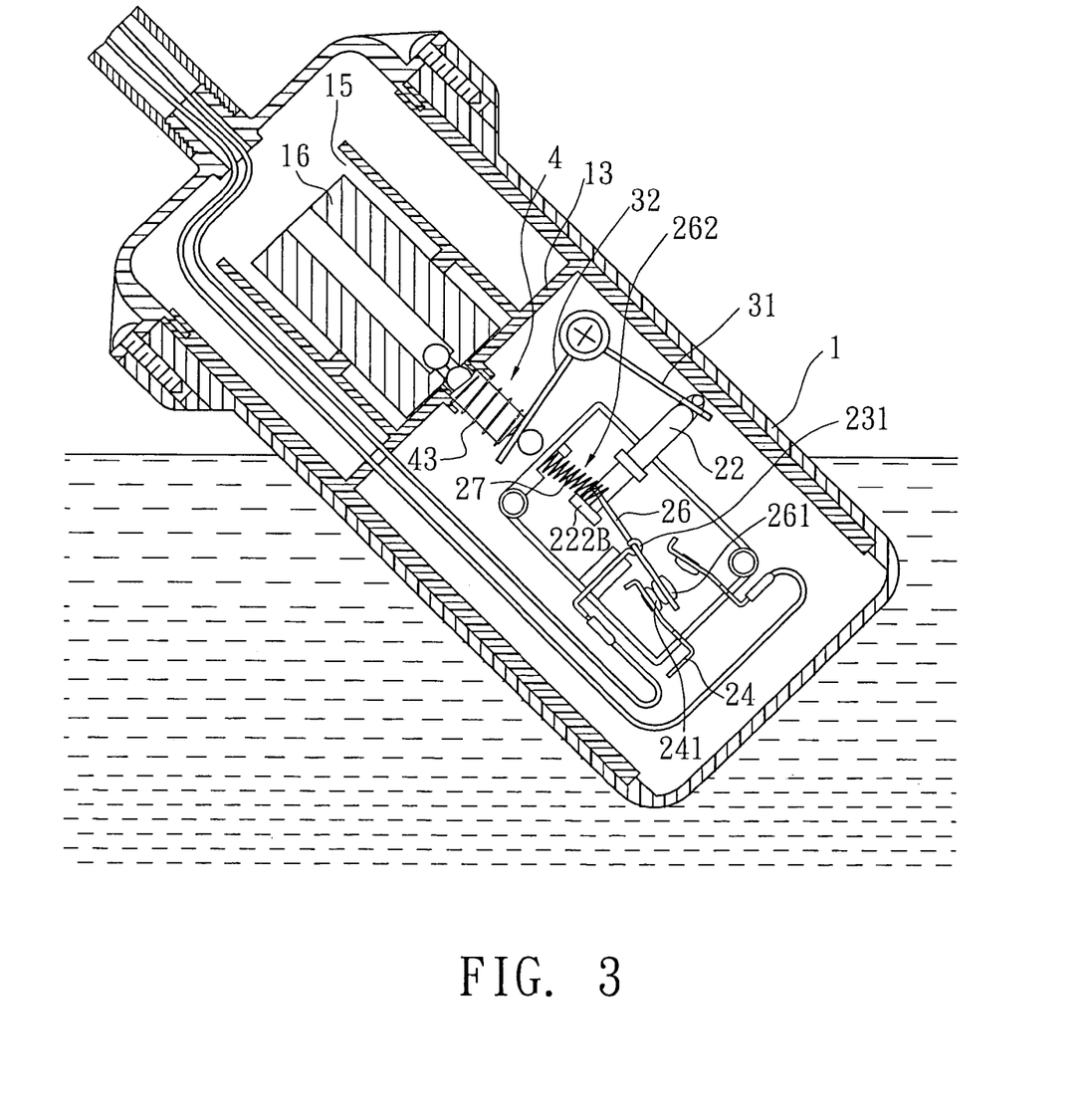
FIG. 3 is a sectional view of the first preferred embodiment of the present invention, showing water not pumped out.

As shown in FIG. 3, while the water level is lower to have the main member 1 tilted for about 45 degrees, the bob 16 moves toward the separating section 13 because of gravity also to move the second end 32 of the activating plate 3 to an opposite orientation via the connecting device 4. The first end 31 of the activating plate 3 moves the bar 22 of the switch 2 outwardly, therefore the second block 222B of the bar 22 moves the joint 262 to move the first electrical contact portion 261 of the lever 26 to the second electrical contact portion 241 of the second terminal 24 from the third electrical contact portion 251 of the third terminal 25. As a result, the pump is turned off.

While the float switch of the present invention is provided to control the pump pumping water in a tank, the wire 21 is connected to the first terminal 23 and the second terminal 24 of the switch 2. The operation of the float switch of the present invention is as same as the description above but the pump is turned on when the water level is low and is turned off when the tank is filled.

The bob 16 is in firm connection with the switch 2 via the activating plate 3 that make the float switch of the present invention is less affected by the waves on water to turn on and off the switch 2 repeatedly.

The L-shaped activating plate 3 provides a line arrangement of the bob and the switch 2 that narrows a width of the main member 1 to install the float switch of the present invention in a narrow space.

The end of the lever 26 in the space 222C and fitted to the elastic member 27 forms the joint 262, in which the joint 262 is moved to move the first electrical contact portion 261 of the lever 26 between the second electrical contact portion 241 of the second terminal 24 and the third electrical contact portion 251 of the third terminal 25 because of the elasticity of the elastic member 27 and the pivot at the middle section of the lever 26. Until the joint 262 is moved by the bar 26 again, the lever 26 is moved. Because the width of the space 222C is greater than the width of the joint 262, it gives a tolerance therebetween so that the lever 26 keeps still to contact the first electrical contact portion 261 with the second electrical contact portion 241 of the second terminal 24 or the third electrical contact portion 251 of the third terminal 25 stably when the waves on water only make a little movement of the bob 16 and is not over the elasticity of the spring 43. As a result, the float switch of the present invention is less affected by the waves on water to turn on and off the switch 2 repeatedly that saves the power and prevents the switch from damage.

Figure 4:
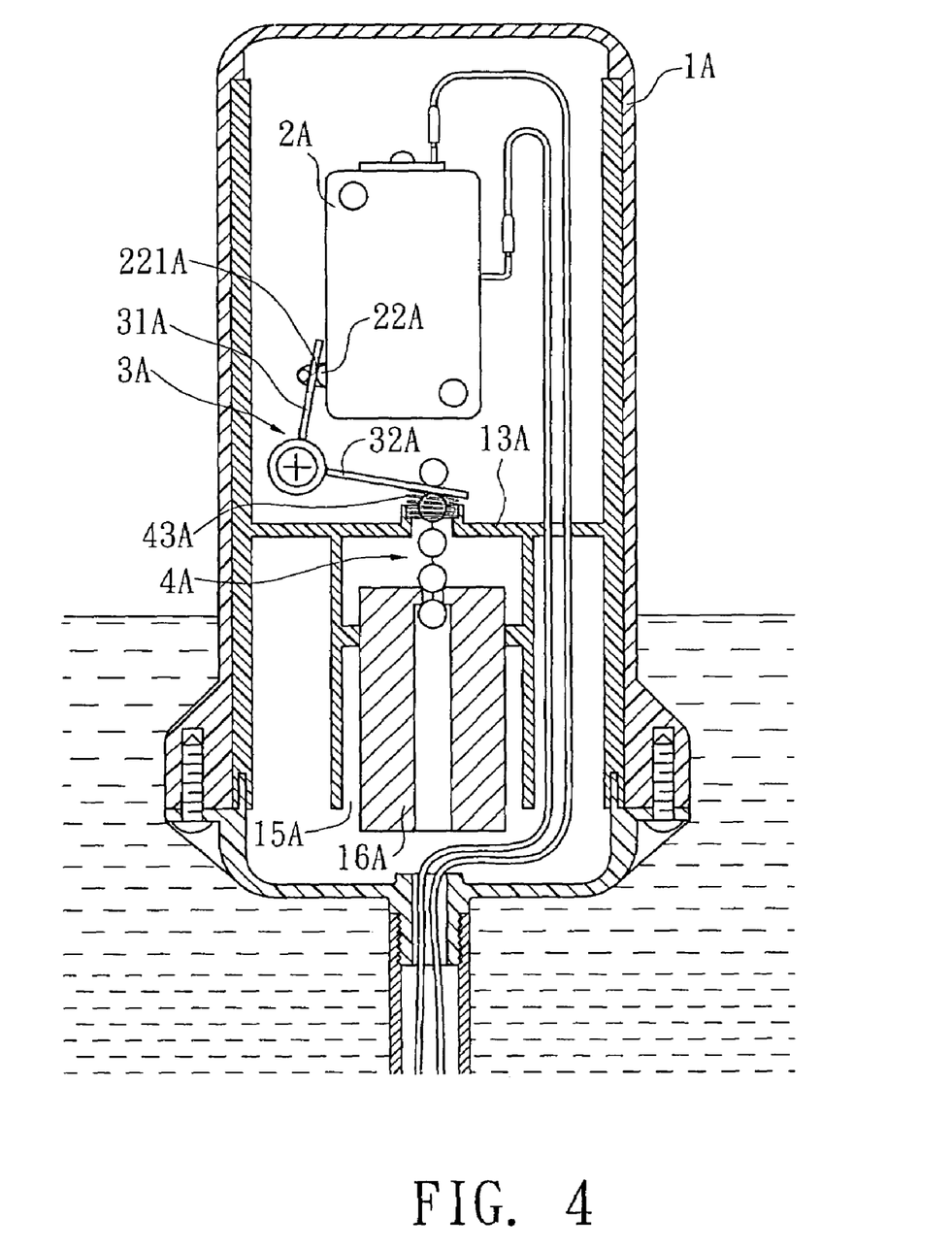
FIG. 4 is a sectional view of a second preferred embodiment of the present invention, showing water being pumped out.

As shown in FIG. 4, a float switch of the second preferred embodiment of the present invention, which is similar to the float switch of the first preferred embodiment, except that a conventional microswitch 2A replaces the switch of the first preferred embodiment. The microswitch 2A has a bar 22A to turn on or off a circuit therein. The bar 22A is moved by an elastic plate in the microswitch 2A for automatic return. The bar 22A has a slot 21A at a distal end thereof to receive a first end 31A of an activating plate 3A therein. In the second preferred embodiment, a connecting device 4A, which connects a second end 32A of the activating plate 3A and a bob 16A, is a flexible element, which is a ball chain. An expansion spring 43A is fitted to the ball chain with opposite ends thereof rested on a separating section 13A and the second end 32A of the activating plate 3A. While a main member 1A is upright, the bob 16A moves in an apartment 15A and distal to the separating section 13A because of gravity to move the second end 32 of the activating plate 3A downwardly. As a result, the first end 31A of the activating plate 3A presses the bar 22A of the microswitch 2A to turn on a pump for pumping water out.

Figure 5:
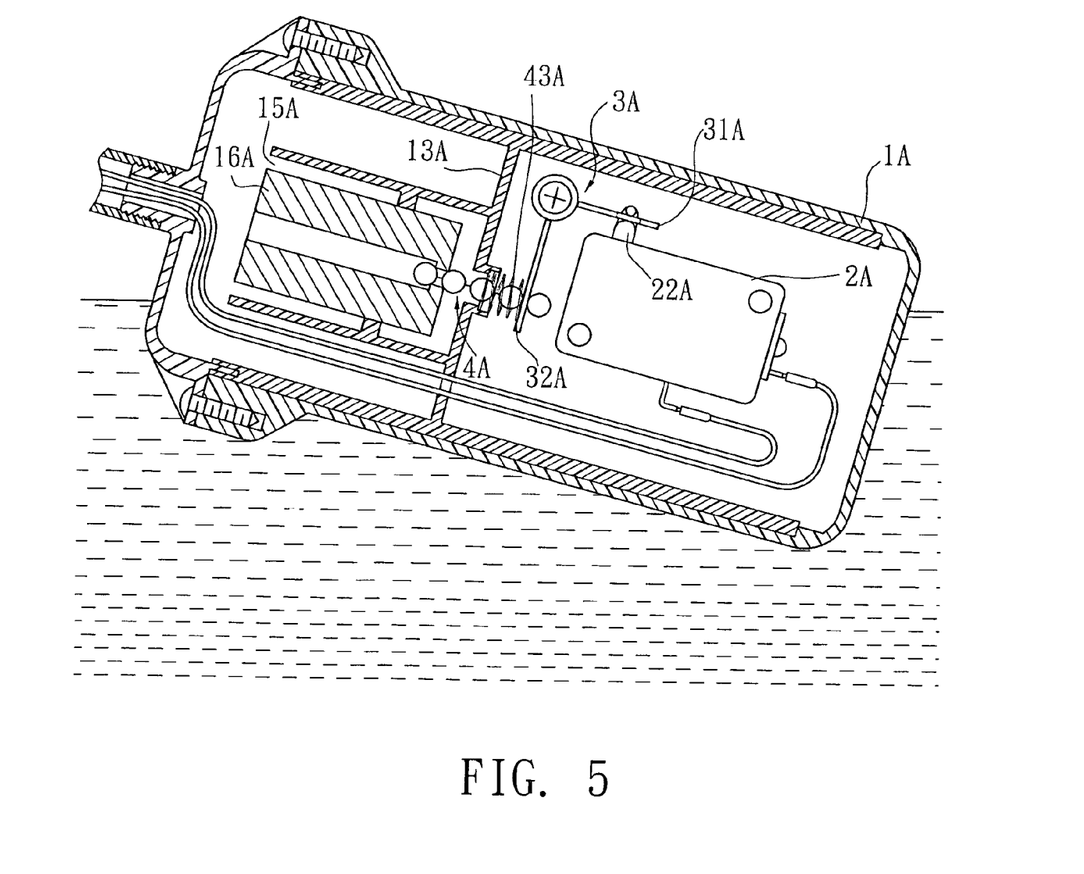
FIG. 5 is a sectional view of the second preferred embodiment of the present invention, showing water not pumped out.

As shown in FIG. 5, while the water level is lower to a predetermined height and the main member 1A is tilted for about 90 degrees, the bob 16A moves toward the separating section 13A that the bar 22A of the microswitch 2A is no longer drawn by the activating plate 3A and the elastic plate in the microswitch 2A and the spring 43A return the bar 22A automatically to cut off the circuit and to stop the pump.

Figure 6:
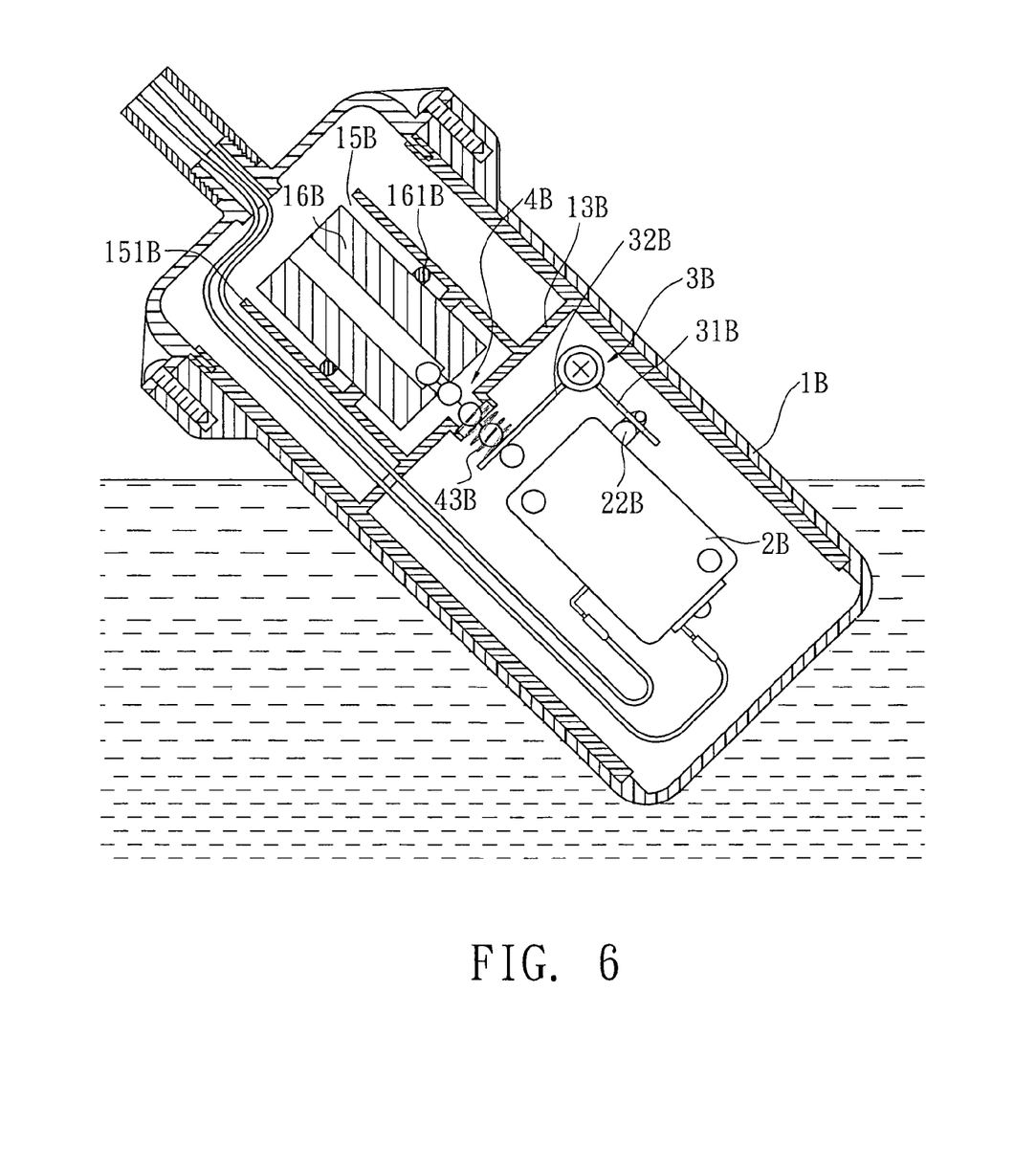
FIG. 6 is a sectional view of a third preferred embodiment of the present invention, showing water not pumped out.

The switch of the second preferred embodiment is the conventional microswitch and the connecting device is the ball chain, such that the float switch stops the pump while the main member is tilted for about 90 degrees. If the float switch stops the pump when the water level is pretty low, the movement of the bob has to lower its sensitivity. As shown in FIG. 6, a float switch of the third preferred embodiment of the present invention has a bob 16B fitted with a ring 161B. The ring 161B touches a plate 151B to provide the bob 16B a friction, such that the bob 16B is less sensitive for movement. The gravity of the bob 16B overcomes the friction between the ring 161B and the plate 151B to move the bob 16B toward a separating section until the water level is lowered to a lower height to have a main member 1B tilted about 45 degrees. As a result, a second end 32B of an activating plate 3B is released to have a bar 22B of a microswitch 2B bounced up by an elastic plate and an expansion spring 43B, such that the circuit is cut to stop the pump at the lower water level.

Figure 7:
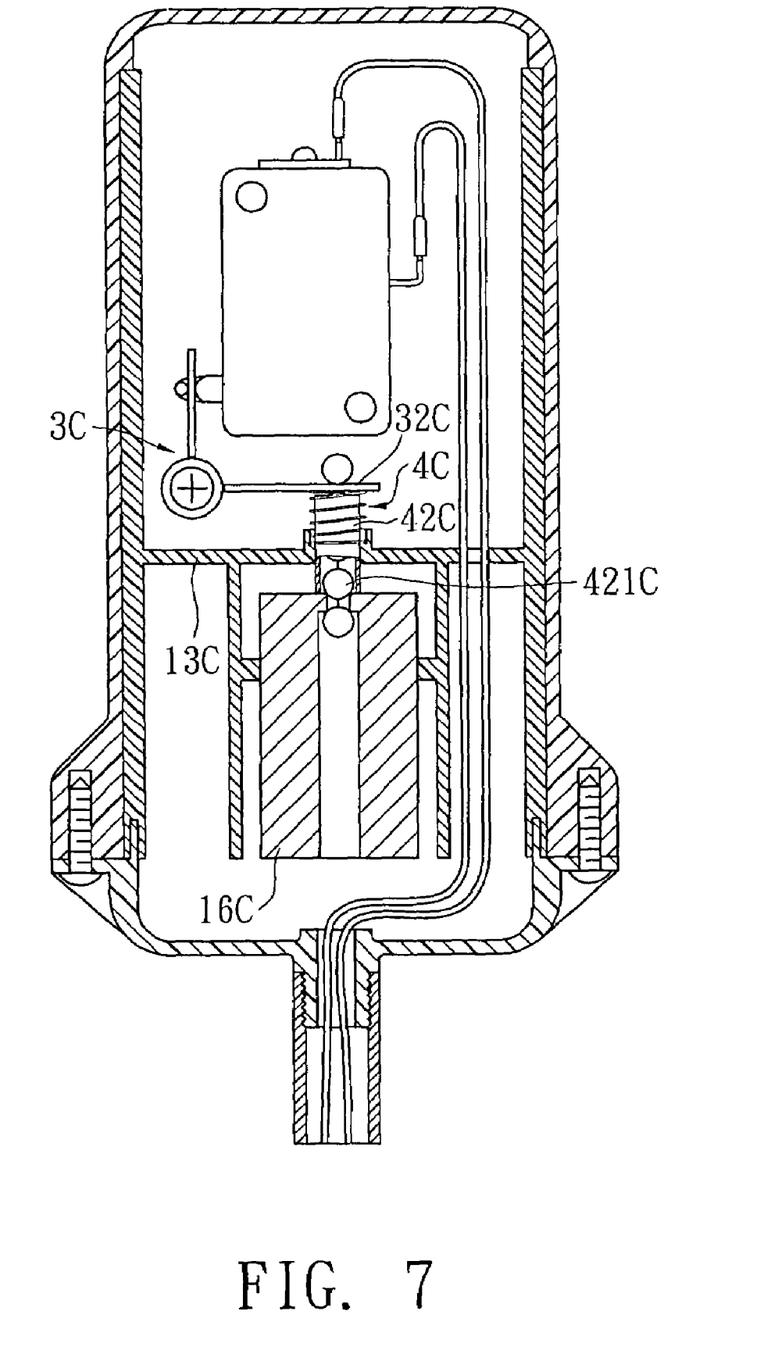
FIG. 7 is a sectional view of a third preferred embodiment of the present invention.

FIG. 7 shows a float switch of the fourth preferred embodiment of the present invention, in which a connecting device 4C has a tube 42C and a ball chain 421C like the connecting device 4 of the first preferred embodiment. The tube 42C has opposite ends against a second end 32C of an activating plate 3C and a bob 16C to fix a distance between the second end 32C of the activating plate 3C and the bob 16C that serves the same function as described above.

What is claimed is:

1. A float switch, comprising a hollow main member in which a bob and a switch are provided, wherein the switch has a bar to control a circuit therein and is connected with a wire, and the bob is connected to the bar of the switch via a L-shaped activating plate whereby the switch is controlled by a movement of the bob;

the main member having an apartment therein to receive the bob therein, and the activating plate being pivoted on the main member between the switch and the bob; the activating plate having a first end associated with the bar of the switch and a second end associated with the bob, wherein the second end is fixed to an end of a connecting device, and an opposite end of the connecting device is fixed to the bob.

2. The float switch as defined in claim 1, wherein the main member has two stop portions projected from opposite sides of a top of an interior wall thereof and a frame member associated with the stop portion, and wherein the frame member has an upper frame, a lower frame and a separating section between the upper frame and the lower frame, in which a top of the upper frame is rested on the stop portions, and a bottom of the lower frame is fitted to a supporting portion adjacent to a bottom of the interior wall of the main member, and wherein a plate is projected from the separating section to the lower frame to have the apartment therein and to receive the bob in the apartment, and wherein the switch is fixed on the upper frame and the activating plate is pivoted on the upper frame also, and the wire connected to the switch has an end exuded out of the main member and fixed to a fixed portion to be connected to a pump, and wherein the separating section has a passageway in which the connecting device is received to connect the activating plate and the bob.

3. The float switch as defined in claim 2, wherein the switch is a microswitch having a bar to control a circuit therein and an elastic plate therein to return the bar automatically, wherein the bar has a slot at a distal end thereof to receive the first end of the activating plate, and the second end of the activating plate is connected to the bob via the connecting plate.

4. The float switch as defined in claim 3, wherein the connecting device is a ball chain having opposite ends thereof fixed to the second end of the of the activating plate and the bob respectively.

5. The float switch as defined in claim 3, wherein the connecting device has a tube and a ball chain received in the tube, wherein the ball chain has opposite ends fixed to the second end of the activating plate and the bob respectively, and the tube has opposite ends against the second end of the of the activating plate and the bob respectively.

6. The float switch as defined in claim 5, further comprising an expansion spring fitted to the tube between the separating section and the second end of the of the activating plate.

7. The float switch as defined in claim 3, further comprising a ring fitted to the bob.

8. The float switch as defined in claim 2, wherein the bar of the switch has a slot at a distal end thereof to receive the first end of the activating plate therein, and a proximal end of the bar is received in the switch having a first block, a second block and a space between the first block and the second block, wherein the second block stops the bar escaping from the switch, and wherein the switch has a first terminal and a second terminal to be electrically connected to wire, and the first terminal has a pivot portion at an end opposite to the wire to pivot a middle section of a lever thereon, which the lever has a first electrical contact portion at an end thereof, and an opposite end of the lever is received in the space between the first block and the second block on which a elastic member is fitted to, and an opposite end of the elastic member is rested on an interior wall of the switch, such that a movable joint is formed at the end of the lever received in the space and fitted to the elastic member, and wherein the second terminal has a second electrical contact portion at an end opposite to the wire and associated with the first electrical contact portion of the lever, such that the first electrical contact portion of the lever is moved to contact the second electrical contact portion of the second terminal to form a circuit.

9. The float switch as defined in claim 8, wherein the switch further has a third terminal connected to the wire, which has a third electrical contact portion at an end opposite to the wire and associated with the first electrical contact portion of the lever, such that the first electrical contact portion of the lever is moved to contact the third electrical contact portion of the third terminal to form another circuit.

10. The float switch as defined in claim 8, wherein a width of the space is greater than that of the joint.

11. The float switch as defined in claim 8, wherein the connecting device has a tube and a ball chain received in the tube, wherein the ball chain has opposite ends fixed to the second end of the activating plate and the bob respectively, and the tube has opposite ends against the second end of the of the activating plate and the bob respectively.

12. The float switch as defined in claim 11, further comprising an expansion spring fitted to the tube between the separating section and the second end of the of the activating plate.

* * * * *